US011648936B2

(12) United States Patent
Gao et al.

(10) Patent No.: US 11,648,936 B2
(45) Date of Patent: May 16, 2023

(54) METHOD AND APPARATUS FOR CONTROLLING VEHICLE

(71) Applicant: BEIJING BAIDU NETCOM SCIENCE AND TECHNOLOGY CO., LTD., Beijing (CN)

(72) Inventors: Bin Gao, Beijing (CN); Xiang Liu, Beijing (CN); Shuang Zhang, Beijing (CN); Xiaoxing Zhu, Beijing (CN); Fan Yang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 319 days.

(21) Appl. No.: 16/895,299

(22) Filed: Jun. 8, 2020

(65) Prior Publication Data

US 2021/0107469 A1 Apr. 15, 2021

(30) Foreign Application Priority Data

Oct. 9, 2019 (CN) .......................... 201910953742.9

(51) Int. Cl.
*B60W 30/09* (2012.01)
*B60W 60/00* (2020.01)
*B60W 30/095* (2012.01)

(52) U.S. Cl.
CPC ........ *B60W 30/09* (2013.01); *B60W 30/0956* (2013.01); *B60W 60/0016* (2020.02); *B60W 2554/80* (2020.02)

(58) Field of Classification Search
CPC ............. B60W 30/09; B60W 30/0956; B60W 60/0016; B60W 2554/80; B60W 2420/52;
(Continued)

(56) References Cited

U.S. PATENT DOCUMENTS 5,572,428 A * 11/1996 Ishida ............ B60W 30/18145
180/170
5,612,883 A * 3/1997 Shaffer ................ G05D 1/0242
702/159
(Continued)

FOREIGN PATENT DOCUMENTS

CN 102227612 A 10/2011
CN 104520894 A 4/2015
(Continued)

*Primary Examiner* — Nicholas Kiswanto
*Assistant Examiner* — Danielle Marie Jackson
(74) *Attorney, Agent, or Firm* — Knobbe, Martens, Olson & Bear, LLP

(57) ABSTRACT

A method and apparatus for controlling a vehicle is disclosed. The method may include: determining center points of at least two frames of point clouds collected for an identified obstacle during travelling of the vehicle; performing curve fitting based on the determined center points to obtain a fitted curve; determining a moving velocity of the obstacle based on the fitted curve; predicting whether the vehicle is to be collided with the obstacle when the vehicle continues travelling at a current velocity, based on the moving velocity of the obstacle, the traveling velocity of the vehicle, and a distance between the obstacle and the vehicle; and sending control information to the vehicle, in response to predicting that the vehicle is to be collided with the obstacle when the vehicle continues travelling at the current velocity, the control information being used to control the vehicle to avoid collision with the obstacle.

12 Claims, 7 Drawing Sheets

(58) Field of Classification Search
CPC ... B60W 2554/4042; B60W 60/00272; B60W 30/095; B60W 30/08; G01S 17/931
See application file for complete search history.

(56) References Cited

U.S. PATENT DOCUMENTS

| | | | |
|---|---|---|---|
| 2012/0262284 | A1 | 10/2012 | Irrgang et al. |
| 2014/0249716 | A1* | 9/2014 | Dorum .................... G06F 16/29 345/427 |
| 2017/0178352 | A1* | 6/2017 | Harmsen ................ G06V 10/42 |
| 2019/0143968 | A1* | 5/2019 | Song .................... B60W 40/02 701/301 |
| 2019/0310651 | A1* | 10/2019 | Vallespi-Gonzalez ....................... B60W 60/0015 |
| 2020/0139962 | A1* | 5/2020 | Kim .................. B60W 30/0956 |
| 2020/0294373 | A1* | 9/2020 | Srinivasan ....... G08B 13/19613 |

FOREIGN PATENT DOCUMENTS

| | | |
|---|---|---|
| CN | 104554272 A | 4/2015 |
| CN | 105404844 A | 3/2016 |
| CN | 106536299 A | 3/2017 |
| CN | 108088456 A | 5/2018 |
| CN | 108257418 A | 7/2018 |
| CN | 109407661 A | 3/2019 |
| CN | 109521756 A | 3/2019 |
| CN | 109532662 A | 3/2019 |
| CN | 110111356 A | 8/2019 |
| DE | 102010022706 A1 | 12/2011 |
| JP | 2009035125 A | 2/2009 |
| JP | 2010202139 A | 9/2010 |
| JP | 2019009615 A | 1/2019 |
| JP | 2019138903 A | 8/2019 |

\* cited by examiner

Determine a first relative speed on X axis between the obstacle and the vehicle, based on velocity component on X axis of the moving velocity of the obstacle and velocity component on X axis of the traveling velocity of the vehicle Determine a second relative speed on Y axis between the obstacle and the vehicle, based on velocity component on Y axis of the moving velocity of the obstacle and velocity component on Y axis of the traveling velocity of the vehicle Use a distance on the X axis between the obstacle and the vehicle as an X axis distance, to calculate a ratio of the X axis distance to the first relative speed to obtain a first time Use a distance on the Y axis between the obstacle and the vehicle as a Y axis distance, to calculate a ratio of the Y axis distance to the second relative speed to obtain a second time Predict that the vehicle is going to collide with the obstacle when the vehicle continues travelling at the current travelling velocity, in response to determining that a difference between the first time and the second time is less than a preset time interval

Fig. 8

METHOD AND APPARATUS FOR CONTROLLING VEHICLE

CROSS-REFERENCE TO RELATED APPLICATIONS

This application claims priority to Chinese Patent Application No. 201910953742.9, filed with the China National Intellectual Property Administration (CNIPA) on Oct. 9, 2019, the contents of which are incorporated herein by reference in their entirety.

TECHNICAL FIELD

Embodiments of the present disclosure relate to the field of computer technology, and specifically to a method and apparatus for controlling a vehicle.

BACKGROUND

In an application scenario of autonomous driving, a laser radar may be used to perceive obstacles on the road. When detecting and identifying an obstacle based on point cloud collected by the laser radar, the center point of the point cloud is usually determined as the center point of the obstacle, thereby for analyzing the movement trajectory and movement velocity of the obstacle. In practical applications, the postures of pedestrians, animals, and other soft obstacles may change during movement, such as leaning to one side, turning the body, and large swings of limbs. Therefore, the center point of the point cloud corresponding to such a software obstacle may fluctuate slightly with the change of posture. The fluctuation of the center point of the obstacle may cause a deviation of a predicted trajectory and velocity of the obstacle. These deviations sometimes may affect normal travelling of the autonomous vehicle.

SUMMARY

Embodiments of the present disclosure propose a method and apparatus for controlling a vehicle.

In a first aspect, some embodiments of the present disclosure provide a method for controlling a vehicle, including: determining center points of at least two frames of point clouds collected for an identified obstacle during travelling of the vehicle; performing curve fitting based on the determined at least two center points to obtain a fitted curve; determining a moving velocity of the obstacle based on the fitted curve; predicting whether the vehicle is to be collided with the obstacle when the vehicle continues travelling at a current traveling velocity, based on the moving velocity of the obstacle, the current traveling velocity of the vehicle, and a distance between the obstacle and the vehicle; and sending control information to the vehicle, in response to predicting that the vehicle is to be collided with the obstacle when the vehicle continues travelling at the current traveling velocity, the control information being used to control the vehicle to avoid a collision with the obstacle.

In some embodiments, the method further includes: controlling the vehicle to continue travelling at the current travelling velocity, in response to predicting that the vehicle is not to be collided with the obstacle when the vehicle continues travelling at the current travelling velocity.

In some embodiments, the determining a moving velocity of the obstacle based on the fitted curve, includes: dividing the fitted curve based on an arc length of the fitted curve, to divide the fitted curve into at least one curve segment; and determining the velocity of the obstacle based on coordinates of an endpoint of the fitted curve and coordinates of a dividing point preceding the end point.

In some embodiments, the predicting whether the vehicle is to be collided with the obstacle when the vehicle continues travelling at the current traveling velocity, based on the moving velocity of the obstacle, the current traveling velocity of the vehicle, and the distance between the obstacle and the vehicle, includes: determining a first relative speed on an X axis between the obstacle and the vehicle, based on velocity component on the X axis of the moving velocity of the obstacle and velocity component on the X axis of the traveling velocity of the vehicle; determining a second relative speed on a Y axis between the obstacle and the vehicle, based on velocity component on the Y axis of the moving velocity of the obstacle and velocity component on the Y axis of the traveling velocity of the vehicle; using a distance on the X axis between the obstacle and the vehicle as an X axis distance, to calculate a ratio of the X axis distance to the first relative speed to obtain a first time; using a distance on the Y axis between the obstacle and the vehicle as a Y axis distance, to calculate a ratio of the Y axis distance to the second relative speed to obtain a second time; and predicting that the vehicle is to be collided with the obstacle when the vehicle continues travelling at the current travelling velocity, in response to determining that a difference between the first time and the second time is less than a preset time interval.

In some embodiments, the performing curve fitting based on the determined at least two center points to obtain a fitted curve, includes: performing B-spline curve fitting on the determined at least two center points to obtain a B-spline curve.

In a second aspect, some embodiments of the present disclosure provide an apparatus for controlling a vehicle, including: a first determining unit, configured to determine center points of at least two frames of point clouds collected for an identified obstacle during travelling of the vehicle; a fitting unit, configured to perform curve fitting based on the determined at least two center points to obtain a fitted curve; a second determining unit, configured to determine a moving velocity of the obstacle based on the fitted curve; a prediction unit, configured to predict whether the vehicle is to be collided with the obstacle when the vehicle continues travelling at a current traveling velocity, based on the moving velocity of the obstacle, the current traveling velocity of the vehicle, and a distance between the obstacle and the vehicle;

and a first controlling unit, configured to send control information to the vehicle, in response to predicting that the vehicle is to be collided with the obstacle when the vehicle continues travelling at the current traveling velocity, the control information being used to control the vehicle to avoid a collision with the obstacle.

In some embodiments, the apparatus further includes: a second controlling unit, configured to control the vehicle to continue travelling at the current travelling velocity, in response to predicting that the vehicle is not to be collided with the obstacle when the vehicle continues travelling at the current traveling velocity.

In some embodiments, the second determining unit is further configured to: divide the fitted curve based on an arc length of the fitted curve, to divide the fitted curve into at least one curve segment; determine the velocity of the obstacle based on coordinates of an end point of the fitted curve and coordinates of a dividing point preceding the end point.

In some embodiments, the prediction unit is further configured to: determine a first relative speed on an X axis between the obstacle and the vehicle, based on velocity component on the X axis of the moving velocity of the obstacle and velocity component on the X axis of the traveling velocity of the vehicle; determine a second relative speed on a Y axis between the obstacle and the vehicle, based on velocity component on the Y axis of the moving velocity of the obstacle and velocity component on the Y axis of the traveling velocity of the vehicle; use a distance on the X axis between the obstacle and the vehicle as an X axis distance, to calculate a ratio of the X axis distance to the first relative speed to obtain a first time; use a distance on the Y axis between the obstacle and the vehicle as a Y axis distance, to calculate a ratio of the Y axis distance to the second relative speed to obtain a second time; and predict that the vehicle is to be collided with the obstacle when the vehicle continues travelling at the current traveling velocity, in response to determining that a difference between the first time and the second time is less than a preset time interval.

In some embodiments, the fitting unit is further configured to: perform B-spline curve fitting on the determined at least two center points to obtain a B-spline curve.

In a third aspect, some embodiments of the present disclosure provide a device, including: one or more processors; and a storage apparatus, storing one or more programs thereon, the one or more programs, when executed by the one or more processors, cause the one or more processors to implement the method according to any one of the implementations described in the first aspect.

In a fourth aspect, some embodiments of the present disclosure provide a computer readable medium, storing a computer program thereon, the program, when executed by a processor, implements the method according to any one of the implementations described in the first aspect.

The method for controlling a vehicle according to embodiments of the present disclosure may include, first determining center points of the point clouds in at least two frames of point clouds collected for an identified obstacle during travelling of the vehicle; next performing curve fitting based on the determined at least two center points to obtain a fitted curve; then determining a moving velocity of the obstacle based on the fitted curve; and finally predicting whether the vehicle is to be collided with the obstacle when the vehicle continues travelling at a current velocity, based on the moving velocity of the obstacle, the traveling velocity of the vehicle, and a distance between the obstacle and the vehicle. If it is predicted that the vehicle is to be collided with the obstacle when the vehicle continues travelling at the current velocity, control information is sent to the vehicle, to control the vehicle to avoid collision with the obstacle. In the present embodiment, the moving velocity of the obstacle is determined through the fitted curve, which may reduce the influence caused by the fluctuation of the center point due to a shape change of the obstacle, and make the determined moving velocity of the obstacle more accurate, thereby reducing the influence of obstacle shape changes on the normal travelling of the autonomous vehicle, and improving the safety of vehicle driving.

BRIEF DESCRIPTION OF THE DRAWINGS

By reading the detailed description of non-limiting embodiments with reference to the following accompanying drawings, other features, objectives and advantages of the present disclosure will become more apparent:

FIG. 8 is a flowchart of a method for predicting whether the vehicle is to be collided with the obstacle when the vehicle continues travelling at the current traveling velocity.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
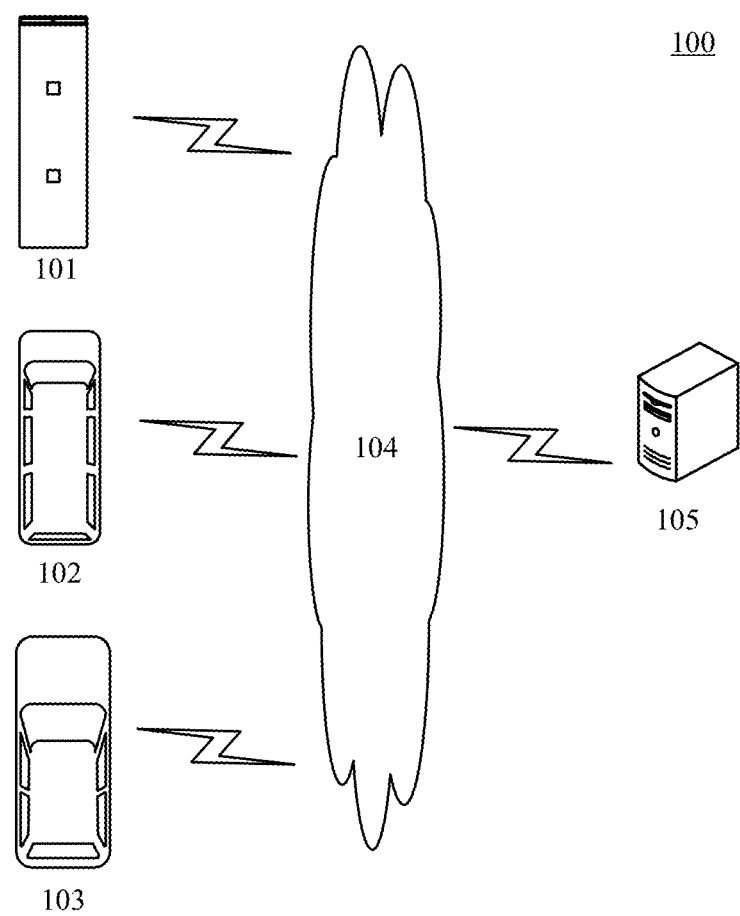
FIG. 1 is a diagram of an example system architecture in which some embodiments of the present disclosure may be implemented.

FIG. 1 illustrates an example system architecture 100 in which a method for controlling a vehicle or an apparatus for controlling a vehicle of embodiments of the present disclosure may be implemented.

As shown in FIG. 1, the system architecture 100 may include vehicles 101, 102, 103, a network 104, and a server 105. The network 104 is used to provide a communication link medium between the vehicles 101, 102, 103 and the server 105. The network 104 may include various types of connections, such as wired, wireless communication links, or optic fibers.

The vehicles 101, 102, 103 may interact with the server 105 through the network 104 to receive or send messages, or the like. Various information acquisition apparatuses, such as image acquisition apparatuses, binocular cameras, sensors, laser radars, etc., may be installed on the vehicles 101, 102, and 103. The information acquisition apparatuses may be used to acquire environment information inside and outside the vehicles 101, 102, 103. The vehicles 101, 102, and 103 may also be installed with an in-vehicle intelligent brain (not shown in the figure). The in-vehicle intelligent brain may receive the information acquired by the information acquisition apparatuses, analyze and process the information, and then control the vehicles 101, 102, 103 based on a processing result, to perform corresponding operations (such as continue travelling, or emergency stop). The vehicles 101, 102, and 103 may be vehicles that include an autonomous driving mode, including both fully autonomous vehicles and vehicles that can be switched to the autonomous driving mode.

The vehicles 101, 102, 103 may be various types of vehicles, including but not limited to large passenger cars, tractors, city buses, medium passenger cars, large trucks, small cars, and the like.

The server 105 may be a server that provides various services, such as a backend server that processes information sent by the vehicles 101, 102, and 103. The backend server may perform various analysis processes on the received information, and send control information to the vehicles 101, 102, and 103 based on the processing result to control the vehicles 101, 102, and 103.

It should be noted that the server 105 may be hardware or software. When the server 105 is hardware, it may be implemented as a distributed server cluster composed of a plurality of servers or as a single server. When the server 105 is software, it may be implemented as a plurality of software or software modules (for example, for providing distributed services) or as a single software or software module, which is not specifically limited herein.

It should be understood that the number of vehicles, networks, and servers in FIG. 1 is merely illustrative. Depending on the implementation needs, there may be any number of vehicles, networks, and servers.

It should be noted that the method for controlling a vehicle provided by embodiments of the present disclosure may be executed by the in-vehicle intelligent brain installed on the vehicles 101, 102, and 103, or may be executed by the server 105. Correspondingly, the apparatus for controlling a vehicle may be provided in the in-vehicle intelligent brain installed on the vehicles 101, 102, 103, or may be provided in the server 105.

Figure 2:
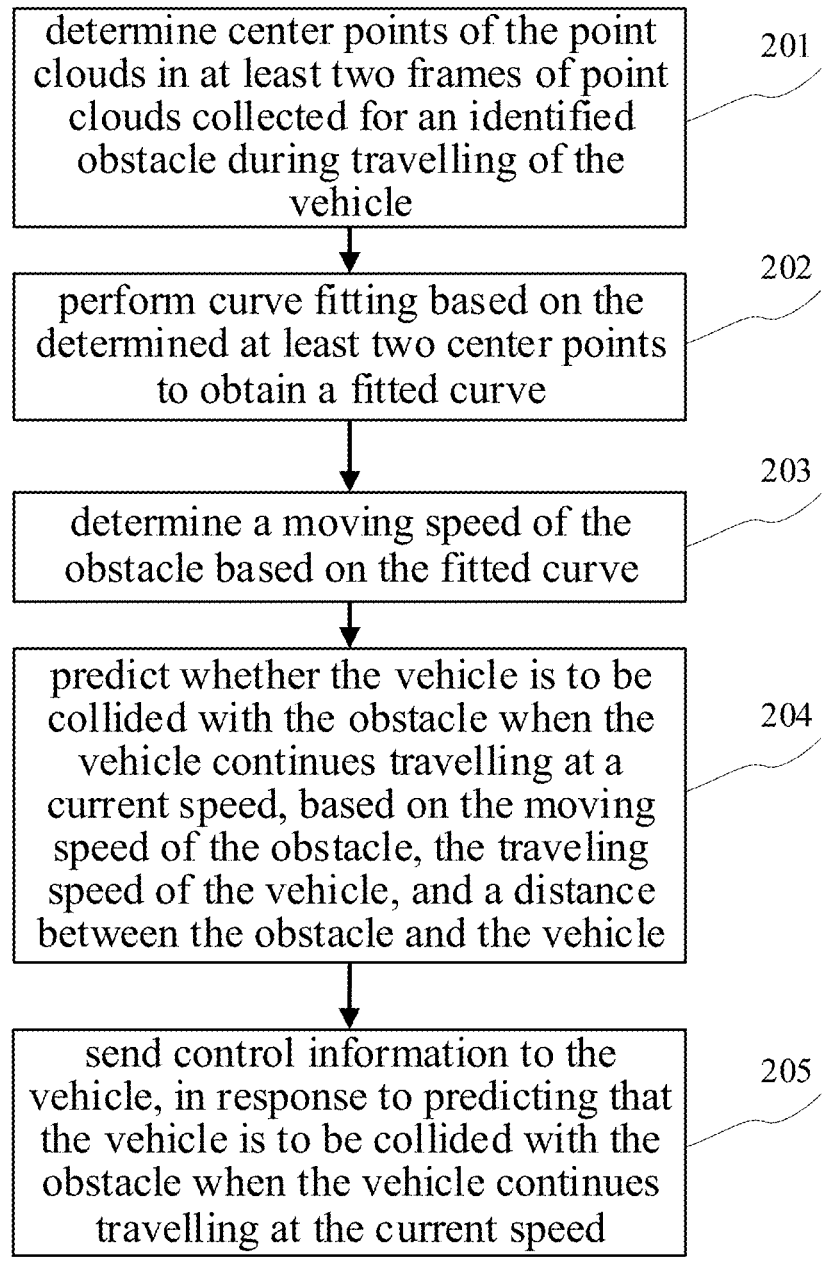
FIG. 2 is a flowchart of a method for controlling a vehicle according to an embodiment of the present disclosure.

With further reference to FIG. 2, a flow 200 of a method for controlling a vehicle according to an embodiment of the present disclosure is illustrated. The method for controlling a vehicle includes the following steps:

Step 201, determining center points of at least two frames of point clouds collected for an identified obstacle during travelling of the vehicle.

In the present embodiment, an executing body (for example, the in-vehicle intelligent brain or server 105 of the vehicles 101, 102, and 103 shown in FIG. 1) of the method for controlling a vehicle may first acquire point clouds collected during the travelling of the vehicle through a wired or a wireless connection, and identify the point cloud of the obstacle from the acquired each frame of point cloud. Here, the point cloud of the obstacle may refer to a point cloud composed of point data for describing the obstacle.

In practice, a laser radar sensor may be installed on the vehicle. In this way, during the travelling of the vehicle, the laser radar sensor may collect point clouds of objects in the vehicle's surrounding environment in real time. The point clouds includes a plurality of point data, and each piece of the point data may include three-dimensional coordinates. Typically, the three-dimensional coordinates of a piece of point data may include information on the X axis, Y axis, and Z axis. The executing body may receive the point clouds collected by the laser radar sensor in real time, and perform obstacle identification and tracking on each frame of the received point clouds to identify which point data in the point clouds are used to describe the obstacle and which point data are used to describe non-obstacles (for example, driving permitted area), and which point data in the point cloud data of different frames are used to describe the same obstacle. Here, the obstacle includes but is not limited to a tree, a warning sign, a traffic sign, a pedestrian, an animal, a vehicle, and so on.

Here, the executing body may determine the center points of each frame of the at least two frames of point clouds collected for the identified obstacle during the travelling of the vehicle. Here, the at least two frames of point clouds may refer to at least two frames of point clouds consecutively collected at the current collection time and at least one collection time preceding the current collection time. Specifically, the executing body may determine the center point of the point cloud of the obstacle collected at the current collection time. The executing body may also determine the center point of each frame of point cloud of the obstacle collected at least one collection time preceding the current collection time, so as to obtain at least two center points. As an example, the center point of a frame of point cloud of the obstacle may be determined by the following method: calculating an average value of the coordinates of the plurality of point data included in the frame of point cloud of the obstacle, and determining the result of the calculation as the center point of the frame of point cloud of the obstacle.

Step 202, performing curve fitting based on the determined at least two center points to obtain a fitted curve.

In the present embodiment, the executing body may use various curve fitting methods to perform curve fitting based on the at least two center points determined in step 201, thereby obtaining the fitted curve. For example, the least square method may be used for curve fitting. In practice, the obstacle that affects the travelling of the vehicle is normally an obstacle that appears on the ground, and the change of the point cloud of the obstacle on the Z axis during the movement of the obstacle on the ground usually does not affect the travelling of the vehicle. Therefore, when performing curve fitting on the at least two center points, the data of the center points on the Z axis may not be considered. As an example, the data of each of the at least two center points on the X axis and the Y axis may be used for curve fitting, thereby obtaining a two-dimensional fitted curve. Here, the starting point and the ending point of the obtained fitted curve are the first center point and the last center point of the at least two center points, respectively. The center points other than the first center point and the last center point may be distributed approximately uniformly on the two sides of the fitted curve. Here, the arrangement order of the at least two center points may be determined according to the order of the collection time of the point cloud of the corresponding obstacle from early to late.

Figure 7:
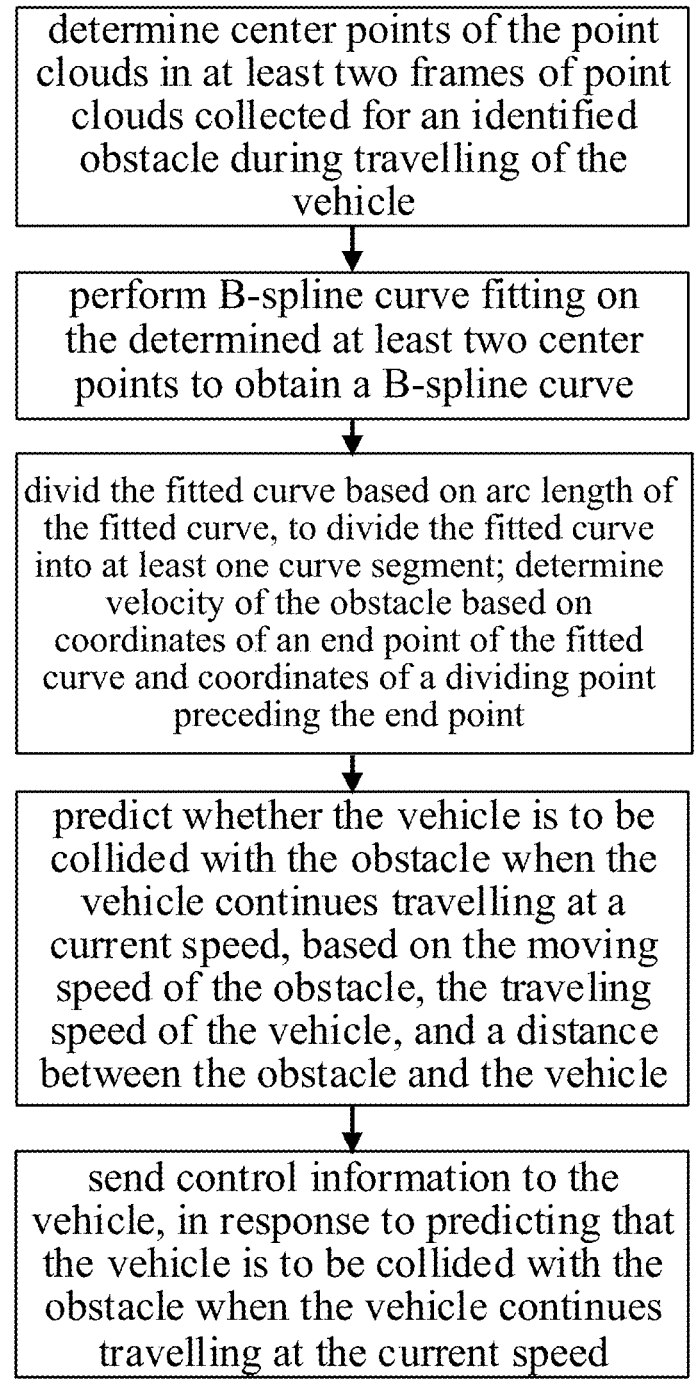
FIG. 7 is a flowchart of a method for controlling a vehicle according to another embodiment of the present disclosure.

In some alternative implementations of the present embodiment, as illustrated in FIG. 7, the step 202 may specifically include the following: performing B-spline curve fitting on the determined at least two center points to obtain a B-spline curve.

In the present implementation, the executing body may perform B-spline curve fitting on the determined at least two center points to obtain the B-spline curve as the fitted curve. The B-spline curve is a type of curve developed on the basis of Bezier curve. In practice, through the study of a change law of the center point of the point cloud during the movement of a large number of soft obstacles (pedestrians, animals, etc.), it is found that the B-spline curve is more in line with the actual movement law of the soft obstacles. Therefore, performing B-spline curve fitting on the determined at least two center points may make the obtained fitted curve more accurate, and thus make the predicted movement velocity of the obstacle more accurate.

Step 203, determining a moving velocity of the identified obstacle based on the fitted curve.

In the present embodiment, the executing body may use various methods to determine the moving velocity of the obstacle based on the fitted curve. Here, the moving velocity may include speed and direction.

In some alternative implementations of the present embodiment, as illustrated in FIG. 7, the step 203 may be specifically performed as follows:

first, dividing the fitted curve based on an arc length of the fitted curve, to divide the fitted curve into at least one curve segment.

In the present implementation, the executing body may divide the fitted curve based on the arc length of the fitted curve obtained in step 202, and the fitted curve is divided into the at least one curve segment according to an inserted dividing point. The at least one curve segment obtained by division may be a curve segment of equal length. Here, the number of the divided curve segments may be determined according to the number of the center points included in the at least two center points. For example, the number of the divided curve segments may be N−1, where N represents the number of the center points. The number of the inserted dividing points may be N−2.

Then, based on the coordinates of an end point of the fitted curve and the coordinates of a dividing point preceding the end point, the velocity of the obstacle is determined.

In the present implementation, the executing body may determine the coordinates of each dividing point, and determine the velocity of the obstacle based on the coordinates of the endpoint of the fitted curve and the coordinates of the dividing point preceding the end point. Here, the velocity of the obstacle may include speed and direction. Specifically, the executing body may determine the velocity of the obstacle according to the following formula:

$$v_x = \frac{x_e - x_p}{\Delta t}, v_y = \frac{y_e - y_p}{\Delta t}$$

Here, $v_x$ represents the velocity component of the obstacle on the X axis; $x_e$ represents the coordinate value of the end point of the fitted curve on the X axis; $x_p$ represents the coordinate value of the dividing point preceding the end point on the X axis; $v_y$ represents the velocity component of the obstacle on the Y axis; $y_e$ represents the coordinate value of the endpoint of the fitted curve on the Y axis; $y_p$ represents the coordinate value of the dividing point before the endpoint on the Y axis. $\Delta t$ represents the time interval corresponding to the curve segment between the endpoint and the dividing point preceding the end point. Since the curve segments obtained by division are curve segments of an equal length, the time intervals corresponding to the each curve segments are equal.

Step 204, predicting whether the vehicle is to be collided with the obstacle when the vehicle continues travelling at a current traveling velocity, based on the moving velocity of the obstacle, the determined traveling velocity of the vehicle, and a distance between the obstacle and the vehicle.

In the present embodiment, the executing body may predict whether the vehicle is to be collided with the obstacle when the vehicle continues travelling at the current velocity, based on the determined moving velocity of the obstacle, the current traveling velocity of the vehicle, and the distance between the obstacle and the vehicle on the x axis and y axis. Here, the travelling velocity of the vehicle may include speed and direction. For example, the executing body may predict whether the vehicle is to be collided with the obstacle using various methods. For example, the executing body may first determine the movement trajectories of the obstacle and the vehicle based on the determined moving velocity of the obstacle and the traveling velocity of the vehicle. After that, the position corresponding to an intersection point of the trajectories of the obstacle and the vehicle is determined. Then, times when the obstacle and the vehicle arrive at that position are calculated respectively. Finally, based on the calculated difference between the two times, it is predicted whether the vehicle may collide with the obstacle. In practice, the smaller the difference between the two times, the greater the possibility that the obstacle may collide with the vehicle.

In some alternative implementations of the present embodiment, as illustrated in FIG. 8, the step 204 may be specifically performed as follows:

First, determining a first relative speed on an axis between the obstacle and the vehicle, based on velocity component on the X axis of the moving velocity of the obstacle and velocity component on the X axis of the traveling velocity of the vehicle.

In the present implementation, the executing body may determine the first relative speed on the X axis between the obstacle and the vehicle, based on the velocity component of the moving velocity of the obstacle on the X axis and the velocity component of the current traveling velocity of the vehicle on the X axis.

Secondly, determining a second relative speed on the Y axis between the obstacle and the vehicle, based on velocity component on the Y axis of the moving velocity of the obstacle and the velocity component on the Y axis of traveling velocity of the vehicle.

In the present implementation, the executing body may determine the second relative speed on the Y axis between the obstacle and the vehicle, based on the velocity component on the Y axis of the moving velocity of the obstacle on the Y axis and the velocity component on the Y axis of the current traveling velocity of the vehicle.

Thirdly, using a distance on the X axis between the obstacle and the vehicle as an X axis distance, to calculate a ratio of the X axis distance to the first relative speed to obtain a first time.

In the present implementation, the executing body may use the distance on the X axis between the obstacle and the vehicle as the X axis distance. After that, the executing body may calculate the ratio of the X axis distance to the first relative speed, thereby obtaining the first time.

Then, using a distance on the Y axis between the obstacle and the vehicle as a Y axis distance, to calculate a ratio of the Y axis distance to the second relative speed to obtain a second time.

In the present implementation, the executing body may use the distance on the Y axis between the obstacle and the vehicle as the Y axis distance. After that, the executing body may calculate the ratio of the Y axis distance to the second relative speed, thereby obtaining the second time.

Finally, predicting that the vehicle is to be collided with the obstacle when the vehicle continues travelling at the current traveling velocity, in response to determining that a difference between the first time and the second time is less than a preset time interval.

In the present implementation, the executing body may determine whether the difference between the first time and the second time is less than the preset time interval. If yes, it is predicted that the vehicle may collide with the obstacle when the vehicle continues travelling at the current velocity. Here, the above time interval may be set according to actual needs, for example, it may be determined according to the length, width of the vehicle body and the current travelling velocity.

Step 205, sending control information to the vehicle, in response to predicting that the vehicle is to be collided with the obstacle when the vehicle continues travelling at the current velocity.

In the present embodiment, if it is predicted that the vehicle is to be collided with the obstacle when the vehicle continues travelling at the current velocity, the executing body may send the control information to the vehicle. Here, the control information may be used to control the vehicle to avoid collision with the obstacle. For example, the control information may be used to control the vehicle to stop travelling, or to bypass the obstacle.

Figure 3:
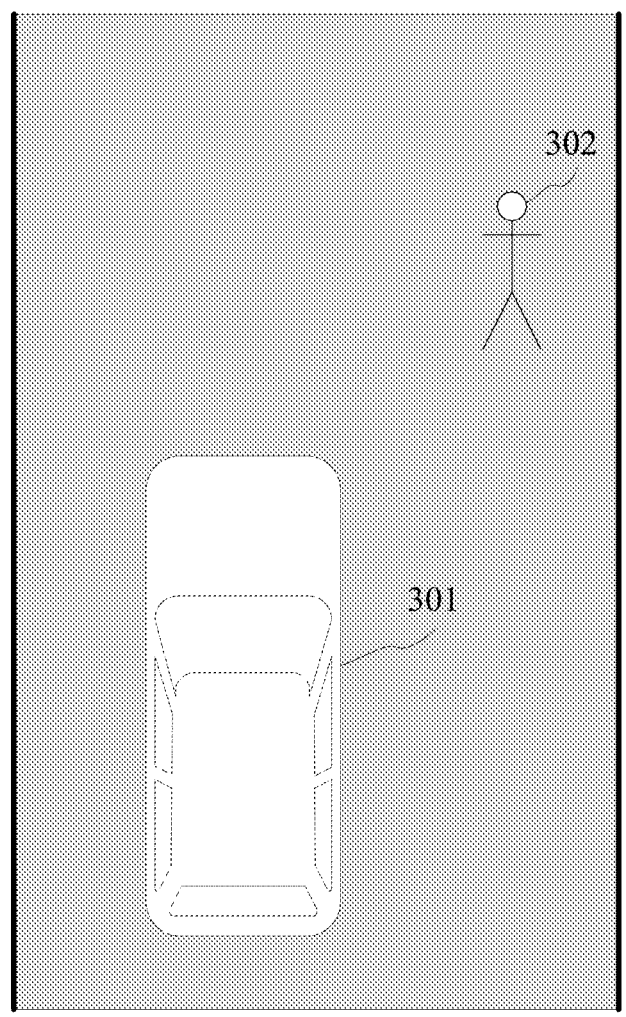
FIG. 3 is a schematic diagram of an application scenario of the method for controlling a vehicle according to an embodiment of the present disclosure.

With further reference to FIG. 3, FIG. 3 is a schematic diagram of an application scenario of the method for controlling a vehicle according to the present embodiment. In the application scenario of FIG. 3, an in-vehicle intelligent brain (not shown in the figure) in a vehicle 301 first determines center points of the point clouds in at least two frames of point clouds collected for an identified obstacle 302 during travelling of the vehicle 301. Secondly, the in-vehicle intelligent brain performs curve fitting based on the determined at least two center points to obtain a fitted curve. After that, the in-vehicle intelligent brain determines the moving velocity of the obstacle 302 based on the fitted curve. Then, the in-vehicle intelligent brain predicts whether the vehicle 301 is to be collided with the obstacle 302 when the vehicle 301 continues travelling at the current velocity, based on the moving velocity of the obstacle 302, the traveling velocity of the vehicle 301, and the distance between the obstacle 302 and the vehicle 301. If it is predicted that the vehicle 301 may collide with the obstacle 302 when the vehicle 301 continues travelling at the current velocity, control information is sent to the vehicle 301. Here, the control information is used to control the vehicle 301 to avoid collision with the obstacle 302.

The method for controlling a vehicle provided by the above embodiments of the present disclosure may include, first determining center points of at least two frames of point clouds collected for an identified obstacle during travelling of the vehicle; and next performing curve fitting based on the determined at least two center points to obtain a fitted curve. In the present embodiment, the moving velocity of the obstacle is determined through the fitted curve, which may reduce the influence caused by the fluctuation of the center point due to shape changes of the obstacle, and make the determined moving velocity of the obstacle more accurate, thereby reducing the influence of obstacle shape changes on the normal travelling of the autonomous vehicle, and improving the safety of vehicle driving.

Figure 4:
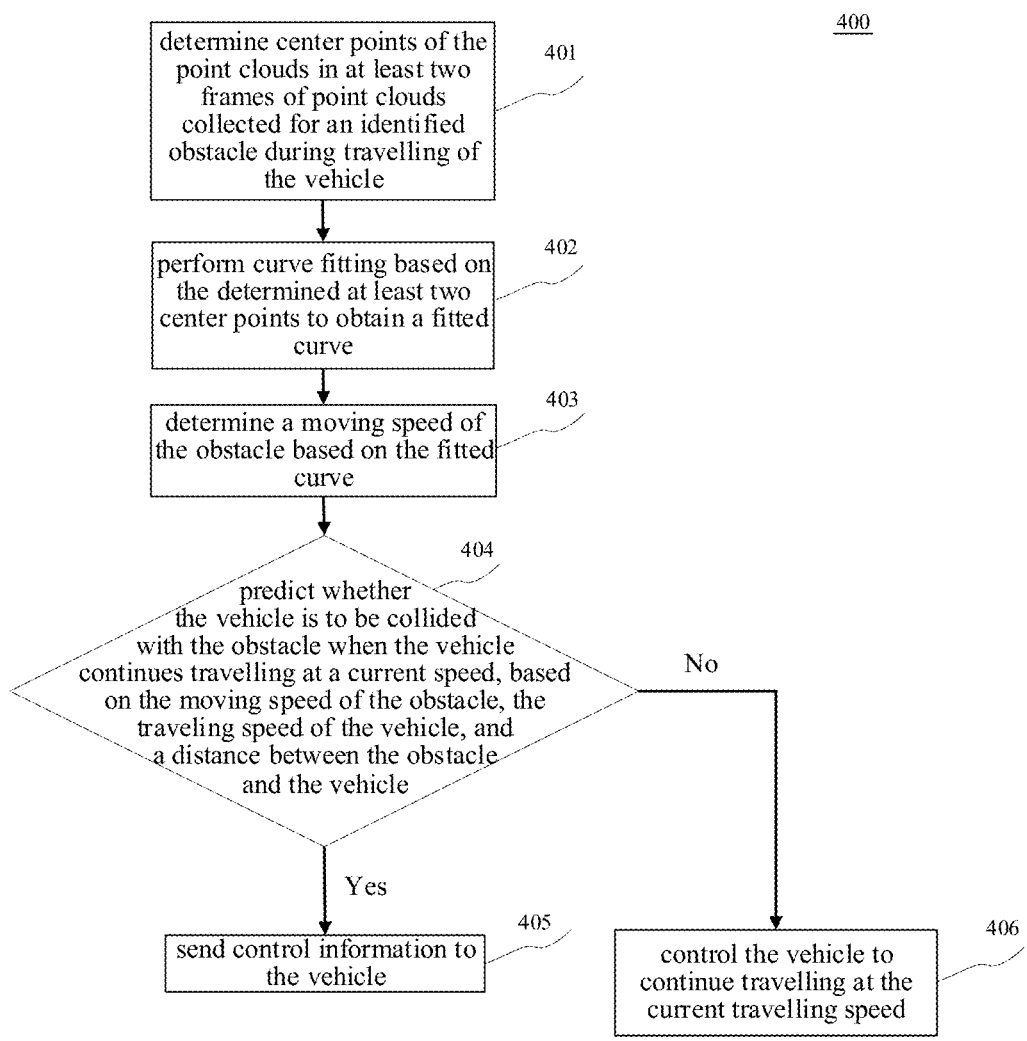
FIG. 4 is a flowchart of the method for controlling a vehicle according to another embodiment of the present disclosure.

With further reference to FIG. 4, a flow 400 of another embodiment of the method for controlling a vehicle is illustrated. The flow 400 of the method for controlling a vehicle includes the following steps:

Step 401, determining center points of at least two frames of point clouds collected for an identified obstacle during travelling of the vehicle.

In the present embodiment, step 401 is similar to step 201 in the embodiment shown in FIG. 2, and detailed description thereof will be omitted.

Step 402, performing curve fitting based on the determined at least two center points to obtain a fitted curve.

In the present embodiment, step 402 is similar to step 202 in the embodiment shown in FIG. 2, and detailed description thereof will be omitted.

Step 403, determining a moving velocity of the obstacle based on the fitted curve.

In the present embodiment, step 403 is similar to step 203 in the embodiment shown in FIG. 2, and detailed description thereof will be omitted.

Step 404, predicting whether the vehicle is to be collided with the obstacle when the vehicle continues travelling at a current traveling velocity, based on the moving velocity of the obstacle, the current traveling velocity of the vehicle, and a distance between the obstacle and the vehicle.

In the present embodiment, step 404 is similar to step 204 in the embodiment shown in FIG. 2, and detailed description thereof will be omitted.

Step 405, sending control information to the vehicle, in response to predicting that the vehicle is to be collided with the obstacle when the vehicle continues travelling at the current traveling velocity.

In the present embodiment, step 405 is similar to step 205 in the embodiment shown in FIG. 2, and detailed description thereof will be omitted.

Step 406, controlling the vehicle to continue travelling at the current travelling velocity, in response to predicting that the vehicle is not to be collided with the obstacle when the vehicle continues travelling at the current velocity.

In the present embodiment, if it is predicted that the vehicle is not to be collided with the obstacle when the vehicle continues travelling at the current velocity, the executing body may control the vehicle to continue travelling at the current travelling velocity.

As can be seen from FIG. 4, compared to the embodiment corresponding to FIG. 2, the flow 400 of the method for controlling a vehicle in the present embodiment highlights the step of controlling the vehicle to continue travelling at the current travelling velocity, when it is predicted that the vehicle is not to be collided with the obstacle when the vehicle continues travelling at the current velocity. Therefore, the solution described in the present embodiment may reduce the influence of obstacle shape changes on the normal travelling of the autonomous vehicle, and may also ensure the normal travelling of the vehicle.

Figure 5:
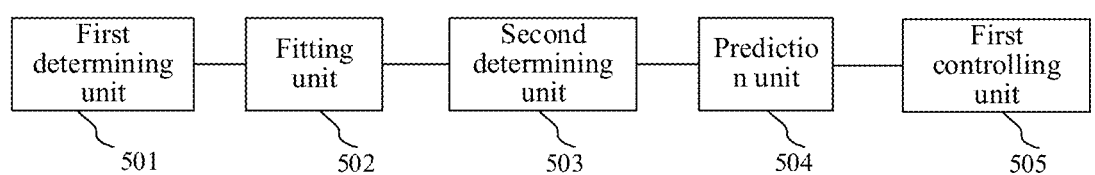
FIG. 5 is a schematic structural diagram of an apparatus for controlling a vehicle according to an embodiment of the present disclosure.

With further reference to FIG. 5, as an implementation of the method shown in the above figures, some embodiments of the present disclosure provide an apparatus for controlling a vehicle, and the apparatus embodiment corresponds to the method embodiment as shown in FIG. 2. The apparatus may be specifically applied to various electronic devices.

As shown in FIG. 5, an apparatus 500 for controlling a vehicle of the present embodiment includes: a first determining unit 501, a fitting unit 502, a second determining unit 503, a prediction unit 504 and a first controlling unit 505. The first determining unit 501 is configured to determine center points of at least two frames of point clouds collected for an identified obstacle during travelling of the vehicle. The fitting unit 502 is configured to perform curve fitting based on the determined at least two center points to obtain a fitted curve. The second determining unit 503 is configured to determine a moving velocity of the identified obstacle based on the fitted curve. The prediction unit 504 is configured to predict whether the vehicle is to be collided with the identified obstacle when the vehicle continues travelling at a current traveling velocity, based on the moving velocity of the obstacle, the current traveling velocity of the vehicle, and a distance between the obstacle and the vehicle. The first controlling unit 505 is configured to send control information to the vehicle, in response to predicting that the vehicle is to be collided with the identified obstacle when the vehicle continues travelling at the current velocity, the control information being used to control the vehicle to avoid collision with the obstacle.

In the present embodiment, for the specific processing and technical effects thereof of the first determining unit 501, the fitting unit 502, the second determining unit 503, the prediction unit 504 and the first controlling unit 505 of the apparatus 500 for controlling a vehicle, reference may be made to the relevant descriptions of step 201, step 202, step 203, step 204, and step 205 in the embodiment corresponding to FIG. 2, and detailed description thereof will be omitted.

In some alternative implementations of the present embodiment, the apparatus 500 further includes: a second controlling unit (not shown in the figure), configured to control the vehicle to continue travelling at the current travelling velocity, in response to predicting that the vehicle is not to be collided with the identified obstacle when the vehicle continues travelling at the current velocity.

In some alternative implementations of the present embodiment, the second determining unit 503 is further configured to: divide the fitted curve based on an arc length of the fitted curve, to divide the fitted curve into at least one curve segment; and determine the velocity of the obstacle based on coordinates of an end point of the fitted curve and coordinates of a dividing point preceding the end point.

In some alternative implementations of the present embodiment, the prediction unit 504 is further configured to: determine a first relative speed on an X axis between the obstacle and the vehicle, based on velocity component on the X axis of the moving velocity of the obstacle and the velocity component on the X axis of traveling velocity of the vehicle; determine a second relative speed on the Y axis between the obstacle and the vehicle, based on velocity component on the Y axis of the moving velocity of the obstacle and velocity component on the Y axis of the traveling velocity of the vehicle; use a distance on the X axis between the obstacle and the vehicle as an X axis distance, to calculate a ratio of the X axis distance to the first relative speed to obtain a first time; use a distance on the Y axis between the obstacle and the vehicle as a Y axis distance, to calculate a ratio of the Y axis distance to the second relative speed to obtain a second time; and predict that the vehicle is to be collided with the obstacle when the vehicle continues travelling at the current traveling velocity, in response to determining that a difference between the first time and the second time is less than a preset time interval.

In some alternative implementations of the present embodiment, the fitting unit 502 is further configured to: perform B-spline curve fitting on the determined at least two center points to obtain a B-spline curve.

Figure 6:
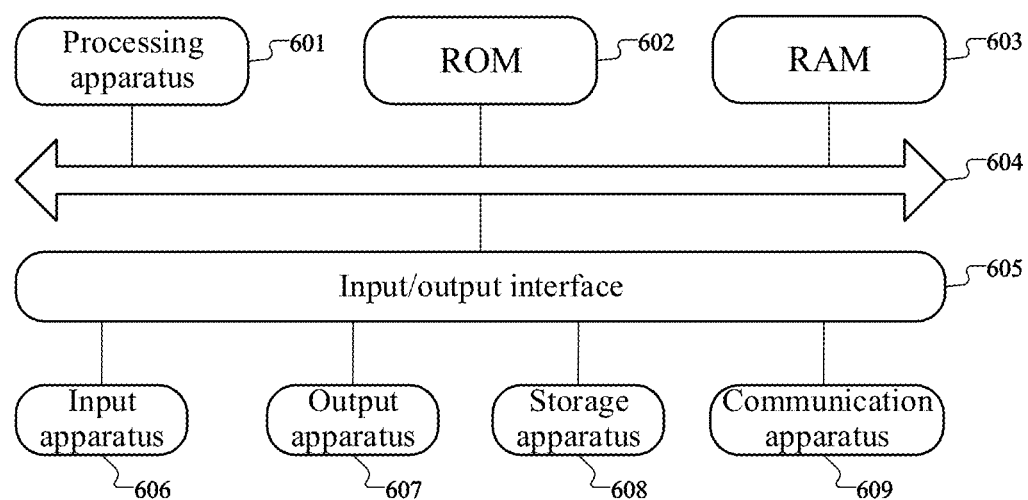
FIG. 6 is a schematic structural diagram of a computer system of an electronic device adapted to implement embodiments of the present disclosure.

With further reference to FIG. 6, a schematic structural diagram of an electronic device (for example, the server or the in-vehicle intelligent brain installed in the vehicles 101, 102, and 103 shown in FIG. 1) 600 adapted to implement embodiments of the present disclosure is illustrated. The electronic device shown in FIG. 6 is merely an example and should not impose any limitation on the function and scope of use of embodiments of the present disclosure.

As shown in FIG. 6, the electronic device 600 may include a processing apparatus (for example, a central processor, a graphics processor, etc.) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses may be connected to the I/O interface 605: an input apparatus 606, including such as a touch screen, a touch pad, a keyboard, a mouse, a camera, a microphone, an accelerometer, or a gyroscope; an output apparatus 607 including such as a liquid crystal display (LCD), a speaker, or a vibrator; the storage apparatus 608 including such as a magnetic tape, or a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all the apparatuses shown. More or fewer apparatuses may be implemented or provided instead. Each block shown in FIG. 6 may represent one apparatus, and may also represent a plurality of apparatuses as required.

In particular, according to embodiments of the present disclosure, the process described above with reference to the flow chart may be implemented in a computer software program. For example, some embodiments of the present disclosure include a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 609, or from the storage apparatus 608, or from the ROM 602. The computer program, when executed by the processing apparatus 601, implements the above mentioned functionalities as defined by the method of embodiments of the present disclosure.

It should be noted that the computer readable medium described in embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer readable storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium.

The computer readable signal medium is capable of transmitting, propagating or transferring programs for use by, or used in combination with, a command execution system, apparatus or element. The program codes contained on the computer readable medium may be transmitted with any suitable medium including but not limited to: wired, optical cable, RF medium etc., or any suitable combination of the above.

The computer readable medium may be included in the above electronic device, or a stand-alone computer readable medium not assembled into the electronic device. The computer readable medium carries one or more programs. The one or more programs, when executed by the electronic device, cause the electronic device to: determine center points of the at least two frames of point clouds collected for an identified obstacle during travelling of the vehicle; performing curve fitting based on the determined at least two center points to obtain a fitted curve; determining a moving velocity of the obstacle based on the fitted curve; predicting whether the vehicle is to be collided with the obstacle when the vehicle continues travelling at a current velocity, based on the moving velocity of the obstacle, the traveling velocity of the vehicle, and a distance between the obstacle and the vehicle; and sending control information to the vehicle, in response to predicting that the vehicle is to be collided with the obstacle when the vehicle continues travelling at the current velocity, the control information being used to control the vehicle to avoid collision with the obstacle.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in embodiments of the present disclosure may be implemented by means of software or hardware. The described units may also be provided in a processor, for example, may be described as: a processor including a first determining unit, a fitting unit, a second determining unit, a prediction unit and a first controlling unit. Here, the names of these units do not in some cases constitute limitations to such units themselves. For example, the fitting unit may also be described as "a unit configured to perform curve fitting based on the determined at least two center points to obtain a fitted curve".

The above description provides an explanation of certain embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for controlling a vehicle, the method comprising:

determining center points of at least two frames of point clouds collected for an identified obstacle during travelling of the vehicle;

performing curve fitting based on the determined at least two center points to obtain a fitted curve;

determining a moving velocity of the obstacle based on the fitted curve;

predicting whether the vehicle is going to collide with the obstacle when the vehicle continues travelling at a current traveling velocity, based on the moving velocity of the obstacle, the current traveling velocity of the vehicle, and a distance between the obstacle and the vehicle, wherein the predicting comprises:

determining a first relative speed on an X axis between the obstacle and the vehicle, based on velocity component on the X axis of the moving velocity of the obstacle and velocity component on the X axis of the traveling velocity of the vehicle;

determining a second relative speed on a Y axis between the obstacle and the vehicle, based on velocity component on the Y axis of the moving velocity of the obstacle and velocity component on the Y axis of the traveling velocity of the vehicle;

using a current distance on the X axis between the obstacle and the vehicle as an X axis distance, to calculate a ratio of the X axis distance to the first relative speed to obtain a first time;

using a current distance on the Y axis between the obstacle and the vehicle as a Y axis distance, to calculate a ratio of the Y axis distance to the second relative speed to obtain a second time; and predicting that the vehicle is going to collide with the obstacle when the vehicle continues travelling at the current travelling velocity, in response to determining that a difference between the first time and the second time is less than a preset time interval; and sending control information to the vehicle, in response to predicting that the vehicle is going to collide with the obstacle when the vehicle continues travelling at the current traveling velocity, the control information being used to control the vehicle to avoid a collision with the obstacle.

2. The method according to claim 1, wherein the method further comprises:

controlling the vehicle to continue travelling at the current travelling velocity, in response to predicting that the vehicle is not going to collide with the obstacle when the vehicle continues travelling at the current travelling velocity.

3. The method according to claim 1, wherein the determining the moving velocity of the obstacle based on the fitted curve, comprises:

dividing the fitted curve based on an arc length of the fitted curve, to divide the fitted curve into at least one curve segment; and determining the velocity of the obstacle based on coordinates of an end point of the fitted curve and coordinates of a dividing point preceding the end point.

4. The method according to claim 1, wherein the performing curve fitting based on the determined at least two center points to obtain a fitted curve, comprises:

performing B-spline curve fitting on the determined at least two center points to obtain a B-spline curve.

5. An apparatus for controlling a vehicle, the apparatus comprising:

at least one processor; and a memory storing instructions, the instructions when executed by the at least one processor, cause the at least one processor to perform operations, the operations comprising:

determining center points of at least two frames of point clouds collected for an identified obstacle during travelling of the vehicle;

performing curve fitting based on the determined at least two center points to obtain a fitted curve;

determining a moving velocity of the obstacle based on the fitted curve;

predicting whether the vehicle is going to collide with the obstacle when the vehicle continues travelling at a current traveling velocity, based on the moving velocity of the obstacle, the current traveling velocity of the vehicle, and a distance between the obstacle and the vehicle, wherein the predicting comprises:

determining a first relative speed on an X axis between the obstacle and the vehicle, based on velocity component on the X axis of the moving velocity of the obstacle and velocity component on the X axis of the traveling velocity of the vehicle;

determining a second relative speed on a Y axis between the obstacle and the vehicle, based on velocity component on the Y axis of the moving velocity of the obstacle and velocity component on the Y axis of the traveling velocity of the vehicle;

using a current distance on the X axis between the obstacle and the vehicle as an X axis distance, to calculate a ratio of the X axis distance to the first relative speed to obtain a first time;

using a current distance on the Y axis between the obstacle and the vehicle as a Y axis distance, to calculate a ratio of the Y axis distance to the second relative speed to obtain a second time; and predicting that the vehicle is going to collide with the obstacle when the vehicle continues travelling at the current travelling velocity, in response to determining that a difference between the first time and the second time is less than a preset time interval; and sending control information to the vehicle, in response to predicting that the vehicle is going to collide with the obstacle when the vehicle continues travelling at the current traveling velocity, the control information being used to control the vehicle to avoid a collision with the obstacle.

6. The apparatus according to claim 5, wherein the operations further comprise:

controlling the vehicle to continue travelling at the current travelling velocity, in response to predicting that the vehicle is not going to collide with the obstacle when the vehicle continues travelling at the current traveling velocity.

7. The apparatus according to claim 5, wherein the determining the moving velocity of the obstacle based on the fitted curve, comprises:

dividing the fitted curve based on an arc length of the fitted curve, to divide the fitted curve into at least one curve segment; and determining the velocity of the obstacle based on coordinates of an end point of the fitted curve and coordinates of a dividing point preceding the end point.

8. The apparatus according to claim 5, wherein the performing curve fitting based on the determined at least two center points to obtain a fitted curve, comprises:

performing B-spline curve fitting on the determined at least two center points to obtain a B-spline curve.

9. A non-transitory computer readable medium, storing a computer program thereon, the program, when executed by a processor, causes the processor to perform operations, the operations including:

determining center points of at least two frames of point clouds collected for an identified obstacle during travelling of the vehicle;

performing curve fitting based on the determined at least two center points to obtain a fitted curve;

determining a moving velocity of the obstacle based on the fitted curve;

predicting whether the vehicle is going to collide with the obstacle when the vehicle continues travelling at a current traveling velocity, based on the moving velocity of the obstacle, the current traveling velocity of the vehicle, and a distance between the obstacle and the vehicle, wherein the predicting comprises:

determining a first relative speed on an X axis between the obstacle and the vehicle, based on velocity component on the X axis of the moving velocity of the obstacle and velocity component on the X axis of the traveling velocity of the vehicle;

determining a second relative speed on a Y axis between the obstacle and the vehicle, based on velocity component on the Y axis of the moving velocity of the obstacle and velocity component on the Y axis of the traveling velocity of the vehicle;

using a current distance on the X axis between the obstacle and the vehicle as an X axis distance, to calculate a ratio of the X axis distance to the first relative speed to obtain a first time;

using a current distance on the Y axis between the obstacle and the vehicle as a Y axis distance, to calculate a ratio of the Y axis distance to the second relative speed to obtain a second time; and predicting that the vehicle is going to collide with the obstacle when the vehicle continues travelling at the current travelling velocity, in response to determining that a difference between the first time and the second time is less than a preset time interval; and sending control information to the vehicle, in response to predicting that the vehicle is going to collide with the obstacle when the vehicle continues travelling at the current traveling velocity, the control information being used to control the vehicle to avoid a collision with the obstacle.

10. The medium according to claim 9, wherein the operations further comprise:

controlling the vehicle to continue travelling at the current travelling velocity, in response to predicting that the vehicle is not going to collide with the obstacle when the vehicle continues travelling at the current travelling velocity.

11. The medium according to claim 9, wherein the determining the moving velocity of the obstacle based on the fitted curve, comprises:

dividing the fitted curve based on an arc length of the fitted curve, to divide the fitted curve into at least one curve segment; and determining the velocity of the obstacle based on coordinates of an end point of the fitted curve and coordinates of a dividing point preceding the end point.

12. The method according to claim 9, wherein the performing curve fitting based on the determined at least two center points to obtain a fitted curve, comprises:

performing B-spline curve fitting on the determined at least two center points to obtain a B-spline curve.

* * * * *

UNITED STATES PATENT AND TRADEMARK OFFICE
CERTIFICATE OF CORRECTION

PATENT NO. : 11,648,936 B2
APPLICATION NO. : 16/895299
DATED : May 16, 2023
INVENTOR(S) : Bin Gao et al.

It is certified that error appears in the above-identified patent and that said Letters Patent is hereby corrected as shown below:

On the Title Page

Item (73), Column 1, Line 2, under Assignee, delete "(BEIIING)" and insert --(BEIJING)--.

In the Drawings

On Sheet 6 of 7, Line 9, FIG. 7, delete "divid" and insert --divide--.

In the Specification

In Column 2, Line 2, delete "endpoint" and insert --end point--.

In Column 7, Line 32, delete "endpoint" and insert --end point--.

In Column 7, Line 48, delete "endpoint" and insert --end point--.

In Column 7, Line 51, delete "endpoint" and insert --end point--.

In the Claims

In Column 17, Claim 12, Line 23, delete "method" and insert --medium--.

Signed and Sealed this
Fifth Day of September, 2023

Katherine Kelly Vidal
*Director of the United States Patent and Trademark Office*